United States Patent [19]

Satake et al.

[11] Patent Number: 4,895,691
[45] Date of Patent: Jan. 23, 1990

[54] POLY(ARYLENE THIOETHER-KETONE) FIBERS AND PRODUCTION PROCESS THEREOF

[75] Inventors: Yoshikatsu Satake; Yo Iizuka, both of Iwaki; Hiroyuki Endo, Ibaraki; Toshitaka Kouyama, Iwaki; Takayuki Katto; Zenya Shiiki, both of Iwaki, all of Japan

[73] Assignee: Kureha Kagaku Kogyo K.K., Tokyo, Japan

[21] Appl. No.: 354,321

[22] Filed: May 19, 1989

Related U.S. Application Data

[62] Division of Ser. No. 194,014, May 12, 1988.

[30] Foreign Application Priority Data

May 15, 1987 [JP] Japan ................. 62-118620
Jul. 21, 1987 [JP] Japan ................. 62-181970
May 7, 1988 [JP] Japan ................. 63-109920

[51] Int. Cl.[4] .................. B29C 55/00; C08F 283/00
[52] U.S. Cl. .................. 264/288.4; 264/290.2; 524/592; 528/222; 528/226
[58] Field of Search ............ 264/288.4, 290.2; 525/471; 524/592; 528/222, 226

[56] References Cited

U.S. PATENT DOCUMENTS 4,590,104 5/1986 Ziener .
4,690,972 9/1987 Johnson et al. .
4,698,415 10/1987 Sinclair et al. .
4,716,212 12/1987 Gaughan .
4,745,167 5/1988 Iizuka et al. .

FOREIGN PATENT DOCUMENTS 270955 6/1988 European Pat. Off. .
274754 7/1988 European Pat. Off. .
280325 8/1988 European Pat. Off. .
3405523 8/1985 Fed. Rep. of Germany .
13347 7/1972 Japan .
58435 4/1985 Japan .
104126 6/1985 Japan .
221229 10/1986 Japan .

OTHER PUBLICATIONS

*Indian J. Chem.*, Vol. 21A, May, 1982, pp. 501–502.
*Indian Journal of Pure and Applied Physics*, Vol. 22, April, 1984, pp. 247–248.
*Mol. Cryst. Liq. Cryst.*, Vol. 83, 1982, pp. 229–238.

Primary Examiner—Morton Foelak
Attorney, Agent, or Firm—Lowe, Price, Leblanc et al.

[57] ABSTRACT

Disclosed herein are poly(arylene thioether-ketone) fibers obtained by melt-spinning a thermoplastic material which comprises 100 parts by weight of a melt-stable poly(arylene thioether-ketone) (PTK) and optionally, up to 50 parts by weight of at least one of thermoplastic resins. The PTK has predominant recurring units of the formula

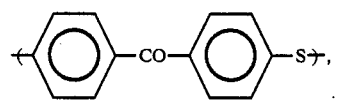

wherein the —CO— and —S— are in the para position to each other, and has a melting point, Tm of 310°–380° C., a residual melt crystallization enthalpy, $\Delta H_{mc}$ (420° C./10 min) of at least 10 J/g, a melt crystallization temperature, $T_{mc}$ (420° C./10 min) of at least 210° C., and a reduced viscosity of 0.3–2 dl/g as determined by viscosity measurement at 25° C. and a polymer concentration of 0.5 g/dl in 98 percent by weight sulfuric acid. The PTK fibers of this invention have high heat resistance and strength.

6 Claims, No Drawings

POLY(ARYLENE THIOETHER-KETONE) FIBERS AND PRODUCTION PROCESS THEREOF

This is a division of application Ser. No. 194,014, filed May 12, 1988.

FIELD OF THE INVENTION

This invention relates to fibers obtained by melt-spinning a thermoplastic material composed principally of a melt-stable poly(arylene thioetherketone) (hereinafter abbreviated as "PTK") having predominant recurring units of the formula

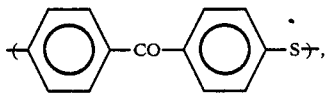

in which the —CO—and —S—are in the para position to each other, and more specifically to PTK fibers having high heat resistance and strength, which are obtained by melt-spinning a thermoplastic material composed of the melt-stable PTK and optionally, at least one of other thermoplastic resins and/or one or more of various fillers.

BACKGROUND OF THE INVENTION

With the advance of weight-, thickness- and length-reducing technology in the field of the electronic and electric industry and with the recent advancement of weight-reducing technology in the fields of the automobile, aircraft and space industries, there has been a strong demand for crystalline thermoplastic resins having heat resistance of about 300° C. or higher and permitting easy melt processing in recent years.

As crystalline, heat-resistant, thermoplastic resins developed to date, there are, for example, poly(butylene terephthalate), polyacetal, poly(p-phenylene thioether), etc. These resins are however unable to meet the recent requirement level for heat resistance.

Polyether ether ketones (hereinafter abbreviated as "PEEKs") and polyether ketones (hereinafter abbreviated as "PEKs") have recently been developed as heat-resistant resins having a melting point of about 300° C. or higher. These resins are crystalline thermoplastic resins. It has therefore been known that conventional melt processing techniques such as extrusion, injection molding, melt spinning, blow molding and laminate molding can be applied to easily form them into various molded or formed articles such as extruded products, injection-molded products, fibers and films. These resins however use expensive fluorine-substituted aromatic compounds such as 4,4'-difluorobenzophenone as their raw materials. Limitations are thus said to exist to the reduction of their costs. It is also pointed out that these resins involve a problem in expanding their consumption.

Based on an assumption that PTKs could be promising candidates for heat-resistant thermoplastic resins like PEEKs and PEKs owing to their similarity in chemical structure, PTKs have been studied to some extent to date. There are some disclosure on PTKs, for example, in Japanese Patent Laid-Open No. 58435/1985 (hereinafter abbreviated as "Publication A"), German Offenlegungsschrift 34 05 523A1 (hereinafter abbreviated as "Publication B"), Japanese Patent Laid-Open No. 104126/1985 (hereinafter abbreviated as "Publication C"), Japanese Patent Laid-Open No. 13347/1972 (hereinafter abbreviated as "Publication D"), Indian J. Chem., 21A, 501–502 (May, 1982) (hereinafter abbreviated as "Publication E"), and Japanese Patent Laid-Open No. 221229/1986 (hereinafter abbreviated as "Publication F").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding, melt spinning, blow molding, laminate molding, etc.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

It was attempted to produce some molded or formed products in Publications A and B. Since the PTKs had poor melt stability, certain specified types of molded or formed products were only obtained by a special molding or forming process, where PTKs were used only as a sort of binder, being impregnated into a great deal of reinforcing fibers of main structural materials and molded or formed under pressure.

Since the conventional PTKs are all insufficient in melt stability as described above, it has been unable to obtain formed products such as fibers even from compositions of the PTKs with another thermoplastic resin and a filler, to say nothing of the PTKs alone, by applying conventional melt processing techniques.

OBJECTS AND SUMMARY OF THE INVENTION

An object of this invention is to overcome the above-mentioned drawbacks of the prior art and hence to provide fibers by melt-spinning a melt-stable PTK which permits easy application of a conventional melt processing technique.

Another object of this invention is to provide fibers, which have high heat resistance and strength, by melt-spinning a thermoplastic material which comprises a melt-stable PTK alone or a composition of a melt-stable PTK and at least one of thermoplastic resins.

A further object of this invention is to produce PTK fibers economically.

The present inventors started an investigation with a view toward using economical dichlorobenzophenone and/or dibromobenzophenone as a raw material for PTKs without employing any expensive fluorine-substituted aromatic compound. In addition, a polymerization process was designed in an attempt to conduct polymerization by increasing the water content in the polymerization system to an extremely high level compared to processes reported previously, adding a polymerization aid and suitably controlling the profile of the polymerization temperature. As a result, high molecular-weight PTKs were obtained economically. The PTKs obtained by the above process were however still dissatisfactory in melt stability.

Thus, the present inventors made further improvements in the polymerization process. It was then revealed that melt-stable PTKs, which permitted the application of conventional melt processing techniques, could be obtained by conducting polymerization without addition of any polymerization aid while paying attention to the selection of a charge ratio of monomers, the shortening of the polymerization time at high temperatures, the selection of a material for a polymerization reactor, etc. and if necessary, by conducting a stabilization treatment in a final stage of the polymerization. It was also found that PTK fibers having high heat resistance and strength could be obtained easily from a thermoplastic material composed principally of the melt-stable PTKs by general melt-processing techniques.

These findings have led to the completion of the present invention.

In one aspect of this invention, there is thus provided poly(arylene thioether-ketone) fibers obtained by melt-spinning a thermoplastic material which comprises:

(A) 100 parts by weight of a melt-stable poly(arylene thioether-ketone) having predominant recurring units of the formula

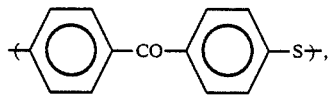

wherein the —CO— and —S— are in the para position to each other, and having the following physical properties (a)–(c):

(a) melting point, Tm being 310–380° C.;
(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter (hereinafter abbreviated as "DSC") at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and
(c) reduced viscosity being 0.3–2 dl/g as determined by viscosity measurement at 25° C. and a polymer concentration of 0.5 g/dl in 98 percent by weight sulfuric acid; and optionally,
(B) up to 50 parts by weight of at least one of thermoplastic resins.

In another aspect of this invention, there is also provided a process for the production of poly(arylene thioether-ketone) fibers, which comprises melt-extruding the above-described thermoplastic material at an extrusion temperature of 320–430° C. through a spinneret, stretching the resultant fibers to a draw ratio of from 1.2:1 to 8:1 within a temperature range of 120–200° C., and then heat setting the thus-stretched fibers at 130–370° C. for 0.1–1,000 seconds.

Owing to the use of the PTK having melt stability, the present invention has made it possible for the first time to obtain PTK fibers having high heat resistance and strength from the PTK or a thermoplastic resin composition composed principally of the PTK in accordance with a melt-spinning technique.

DETAILED DESCRIPTION OF THE INVENTION

Features of the present invention will hereinafter be described in detail.

Chemical Structure of PTKs

The melt stable PTKs according to the present invention are poly(arylene thioether-ketones) (PTKs) having predominant recurring units of the formula

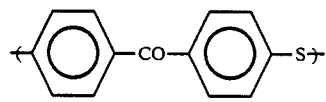

wherein the —CO— and —S— are in the para position to each other. In order to be heatresistant polymers comparable with PEEKs and PEKs, the PTKs of this invention may preferably contain, as a main constituent, the above recurring units in a proportion greater than 50 wt.%, more preferably, of 60 wt.% or higher, most preferably, of 70 wt.% or higher. If the proportion of the recurring units is 50 wt.% or less, there is a potential problem that the crystallinity of the polymer is reduced and its heat resistance is reduced correspondingly.

Exemplary recurring units other than the above recurring units may include:

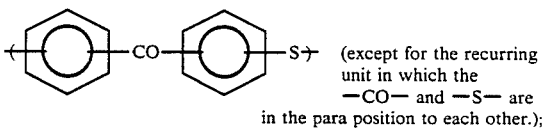 (except for the recurring unit in which the —CO— and —S— are in the para position to each other.);

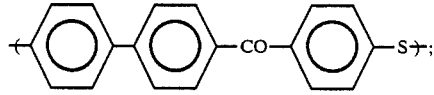

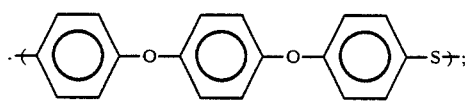

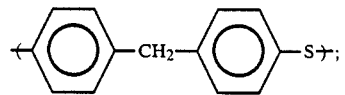

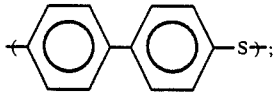

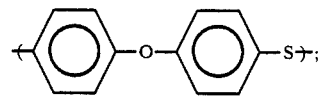

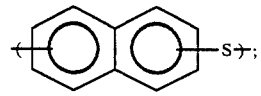

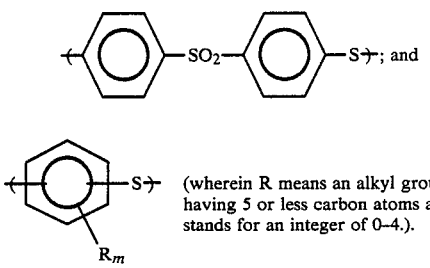

(wherein R means an alkyl group having 5 or less carbon atoms and m stands for an integer of 0–4.).

It is desirable that the melt stable PTKs of this invention are uncured polymers, especially, uncured linear polymers The term "cure" as used herein means a molecular-weight increasing treatment for a polymer by a method other than a usual polycondensation reaction, for example, by a crosslinking, branching or molecular-chain extending reaction, particularly, a molecular-weight increasing treatment by a high-temperature heat treatment or the like. In general, "curing" causes a PTK to lose or decrease its melt stability and crystallinity. Curing therefore makes it difficult to employ conventional melt processing of a PTK. Even if fibers are obtained, they tend to have a low density and reduced crystallinity, in other words, may not be regarded as "heat-resistant fibers" substantially. Curing is hence not preferred.

However, PTKs having a partially crosslinked and/or branched structure to such an extent still allowing the application of conventional melt processing techniques are still embraced in the present invention. For example, PTKs obtained by conducting polymerization in the presence of a small amount of a crosslinking agent (e.g., polychlorobenzophenone, polybromobenzophenone or the like) and PTKs subjected to mild curing can be regarded as melt-stable PTKs useful for fibers according to this invention.

Physical Properties of PTKs

The melt stable PTKs useful in the practice of this invention have the following physical properties.

(a) As indices of the characteristics of heat-resistant polymers, their melting points, Tm range from 310 to 380° C.

(b) As indices of the melt stability of polymers to which conventional melt processing techniques can be applied, their residual melt crystallization enthalpies, $\Delta Hmc$ (420° C./10 min) are at least 10 J/g, and their melt crystallization temperatures, Tmc (420° C./10 min) are at least 210° C.

(c) In the case of extrusion products such as fibers, their shaping is difficult due to drawdown or the like upon melt forming unless the molecular weight is sufficiently high. They should have a sufficiently high molecular weight. As indices of the molecular weights of the polymers, their reduced viscosities $\eta_{red}$ should be within the range of 0.3–2 dl/g.

In the present invention, each reduced viscosity $\eta_{red}$ is expressed by a value as measured at 25° C. and a polymer concentration of 0.5 g/dl in 98 percent by weight sulfuric acid as a solvent.

(d) As indices of the characteristics of highly-crystalline polymers, the polymers have a density of at least 1.34 g/cm$^3$ at 25° C when annealed at 280° C. for 30 minutes.

Next, the physical properties of the melt stable PTKs useful in the practice of this invention will be described in detail.

(1) Heat resistance:

The melting point, Tm of a polymer serves as an index of the heat resistance of the polymer.

The PTKs useful in the practice of this invention have a melting point, Tm of 310–380° C., preferably 320°–375° C., more preferably 330°–370° C. Those having a melting point, Tm lower than 310° C. are insufficient in heat resistance as heat-resistant resins comparable with PEEKs and PEKs. On the other hand, it is difficult to perform the melt processing of those having a melting point, Tm higher than 380° C. without decomposition. Such an excessively low or high melting point is undesired.

(2) Melt stability:

The greatest feature of the PTKs useful in the practice of this invention resides in that they have melt stability sufficient to permit the application of conventional melt processing techniques.

All the conventional PTKs have low melt stability and tend to lose their crystallinity or to undergo crosslinking or carbonization, resulting in a rapid increase in melt viscosity, upon their melt processing.

It is hence possible to obtain an index of the melt processability of a PTK by investigating the residual crystallinity of the PTK after holding it at an elevated temperature of its melt processing temperature or higher for a predetermined period of time. The residual crystallinity can be evaluated quantitatively in terms of melt crystallization enthalpy. Specifically, the residual melt crystallization enthalpy, $\Delta Hmc$ (420° C./10 min) and its melt crystallization temperature, Tmc (420° C./10 min) of the PTK which are determined by a DSC at a cooling rate of 10° C. after the PTK is held at 50° C. for 5 minutes in an inert gas atmosphere, heated to 420° C. at a rate of 75° C./min and then held for 10 minutes at 420° C., can be used as measures of its melt stability. In the case of a PTK having poor melt stability, it undergoes crosslinking or the like at the above high temperature condition of 420° C. and loses its crystallinity substantially.

The melt stable PTKs useful in the practice of this invention are polymers whose residual melt crystallization enthalpies, $\Delta Hmc$ (420° C./10 min) are preferably at least 10 J/g, more preferably at least 15 J/g, most preferably at least 20 J/g and whose melt crystallization temperatures, Tmc (420° C./10 min) are preferably at least 210° C., more preferably at least 220° C., most preferably at least 230° C.

A PTK, whose $\Delta Hmc$ (420° C./10 min) is smaller than 10 J/g or whose Tmc (420° C./10 min) is lower than 210° C., tends to lose its crystallinity or to induce a melt viscosity increase upon its melt processing, so that difficulties are encountered upon application of conventional melt processing techniques such as melt spinning.

(3) Molecular weight:

The solution viscosity, for example, reduced viscosity $\eta_{red}$ of a polymer can be used as an index of its molecular weight.

When a PTK or a PTK composition is subjected to melt spinning, drawdown or the like may occur as a problem upon its melt processing.

Therefore, the molecular weight which is correlated directly to the melt viscosity of the PTK is also an important factor for its melt processability.

In order to apply conventional melt processing techniques, high molecular-weight PTKs whose reduced viscosities, $\eta_{red}$ are preferably 0.3–2 dl/g, more preferably 0.5–2 dl/g, are desired. Since a PTK whose $\eta_{red}$ is lower than 0.3 dl/g has a low melt viscosity and high tendency of drawdown, it is difficult to apply conventional melt processing techniques such as melt spinning. Further, fibers from such a PTK are insufficient in mechanical properties.

On the other hand, a PTK whose $\eta_{red}$ exceeds 2 dl/g is very difficult in production and process.

(4) Crystallinity:

As an index of the crystallinity of a polymer, its density is used.

The PTKs useful in the practice of this invention are desirably polymers whose densities (at 25° C.) are preferably at least 1.34 g/cm$^3$, more preferably at least 1.35 g/cm$^3$ when measured in a crystallized form by annealing them at 280° C. for 30 minutes. Those having a density lower than 1.34 g/cm$^3$ have potential problems that they may have low crystallinity and hence insufficient heat resistance and mechanical properties of resulting fibers may also be insufficient.

In particular, PTKs crosslinked to a high degree (e.g., the PTKs described in Publication A) have been reduced in crystallinity and their densities are generally far lower than 1.34 g/cm$^3$.

Production Process of PTKs

The melt stable PTKs useful in the practice of this invention can each be produced, for example, by subjecting an alkali metal sulfide and a dihalogenated aromatic compound, preferably, dichlorobenzophenone and/or dibromobenzophenone to dehalogenation and sulfuration, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with conventionally-reported polymerization processes while controlling the temperature profile suitably, and if necessary, by choosing the material of a reactor suitably.

Namely, the melt stable PTKs useful in the practice of this invention can each be produced suitably by polymerizing an alkali metal sulfide and a dihalogenated aromatic compound consisting principally of 4,4'-dichlorobenzophenone and/or 4,4'-dibromobenzophenone by dehalogenation and sulfuration under the following conditions (a)–(c) in an organic amide solvent.

(a) ratio of the water content to the amount of the charged organic amide: 2.5–15 (mole/kg);

(b) ratio of the amount of the charged dihalogenated aromatic compound to the amount of the charged alkali metal sulfide: 0.95–1.2 (mole/mole); and (c) reaction temperature: 60–300° C. with a proviso that the reaction time at 210° C. and higher is within 10 hours.

The melt stable PTKs can be obtained more suitably when a reactor at least a portion of which, said portion being brought into contact with the reaction mixture, is made of a corrosion-resistant material such as titanium material.

Optionally, at least one halogen-substituted aromatic compound having at least one substituent group having electron-withdrawing property at least equal to —CO—group (preferably, 4,4'-dichlorobenzophenone and/or 4,4'-dibromobenzophenone employed as a monomer) may be added and reacted (as a stabilization treatment in a final stage of the polymerization) so as to obtain PTKs improved still further in melt stability.

The melt stable PTKs employed in the present invention may preferably be uncured polymers as described above. They may however be PTKs in which a crosslinked structure and/or a branched structure has been incorporated to a certain minor extent. In order to obtain a PTK with a branched or crosslinked structure introduced therein, it is preferable to have a polyhalogenated compound, especially, a polyhalogenated benzophenone having at least three halogen atoms exist as a crosslinking agent in the polymerization reaction system in such an amount that the charge ratio of the monomeric dihalogenated aromatic compound to the polyhalogenated benzophenone ranges from 100/0 to 95/5 (mole/mole). If the amount of the charged polyhalogenated benzophenone is too much, physical properties of the resulting PTK, such as their melt processability, density and crystallinity, will be reduced. It is hence not preferable to charge such a polyhalogenated benzophenone too much.

Thermoplastic Resin

The thermoplastic material used as a raw material for the melt-spinning in this invention may be composed of the melt-stable PTK alone. In view of processability, physical properties, economy and the like, it may also be a resin composition obtained by mixing at least one of other thermoplastic resins in a proportion of 0–50 parts by weight, preferably 0–40 parts by weight, and more preferably 0–30 parts by weight, all, per 100 parts by weight of the PTK. It is not preferable to add the thermoplastic resin in any amount greater than 50 parts by weight, because such a high proportion results in fibers of reduced heat resistance and heat shrinkage resistance.

As exemplary thermoplastic resins useful in the present invention, may be mentioned resins such as poly(arylene thioethers), PEEKs and PEKs, polyamides (including Aramids), polyamideimides, polyesters (including aromatic polyesters and liquid crystalline polyesters), polysulfones, polyether sulfones, polyether imides, polyarylenes, poly(phenylene ethers), polycarbonates, polyester carbonates, polyacetals, fluoropolymers, polyolefins, polystyrenes, polymethyl methacrylate, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers.

Among the above-exemplified thermoplastic resins, poly(arylene thioethers), especially, poly(arylene thioethers) having predominant recurring units of the formula

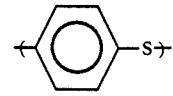

(hereinafter abbreviated as "PATEs"; said recurring units accounting for at least 50 wt.%) are preferred, because the PATEs have good compatibility with the PTK and their blending with the PTK can provide fibers which have mechanical properties improved over those obtained from the PTK alone at room temperature and also heat resistance improved over those obtained from the PATEs alone and are well-balanced in heat resistance and mechanical properties.

Other components:

In this invention, one or more of fibrous fillers and/or inorganic fillers may be added in a proportion up to 10 parts by weight per 100 parts by weight of the PTK as desired. If the proportion of the filler exceeds 10 parts by weight, there is a potential problem that the processability may be deteriorated to a considerable extent and the physical properties of the resulting fibers would be deteriorated.

As exemplary fibrous fillers usable in this invention, may be mentioned fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers.

As exemplary inorganic fillers, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all, in a powder form.

These fibrous fillers and inorganic fillers may be used either singly or in combination.

In this invention, it is feasible to add one or more of additives such as stabilizers, anticorrosives, lubricants, surface-roughening agents, ultraviolet absorbents, nucleating agents, mold-releasing agents, colorants, coupling agents and antistatic agents, as needed.

Production Process of Fibers

The PTK fibers of this invention can be produced by charging a thermoplastic material, which is composed of the melt-stable PTK or the composition of the melt-stable PTK and at least one of thermoplastic resins, for example, into a spinneret-equipped extruder in the air or preferably, in an inert gas atmosphere, extruding the thermoplastic material at an extrusion temperature of 320–430° C., stretching the resultant fibers to a draw ratio of from 1.2:1 to 8:1 within a temperature range of 120–200° C., and then heat setting the thus-stretched fibers at 130–370° C. for 0.1–1,000 seconds. Upon extrusion through the spinneret, fibers are generally taken up at a draw down ratio (the ratio of the take-up speed of spun fibers to the discharge rate of the resin from the spinneret) of from 1:1 to 1000:1, preferably, from 5:1 to 500:1.

If the extrusion temperature from the spinneret is lower than the above temperature range, it is difficult to achieve smooth spinning. If it is too high on the contrary, deterioration of the resin is induced. Extrusion temperatures outside the above range are hence not preferred. The fibers extruded from the spinneret are stretched in the solid state and are hence oriented. The stretching is carried out at a temperature not higher than the melting point of the PTK, preferably, at 120–200° C. The stretching step may be performed, for example, by stretching melt-spun and unstretched fibers in a dry heat bath or wet heat bath of a high temperature or on a hot plate of a high temperature. If the stretching temperature is outside the specified temperature range, end breakages, fuzzing and/or melt bonding tends to take place. Stretching temperatures outside the above temperature range are hence not preferred.

The draw ratio ranges from 1.2:1 to 8:1. Draw ratios smaller than 1.2:1 are difficult to obtain high-strength fibers. On the other hand, draw ratios greater than 8:1 encounter difficulties in stretching and induce end breakages and/or fuzzing. Draw ratios outside the above range are therefore not preferred. By applying heat setting subsequent to stretching, fibers having high strength and a small heat shrinkage factor can be obtained.

Physical Properties of Fibers

The PTK fibers of this invention generally have a fiber diameter of 0.5–1,000 μm, preferably, 1–300 μm and has the following excellent physical properties:

(a) density of PTK portions being at least 1.34 g/cm$^3$ at 25° C.;

(b) tensile strength being at least 10 kg/mm$^2$ at 23° C. or at least 3 kg/mm$^2$ at 250° C.;

(c) tensile modulus being at least 100 kg/mm$^2$ at 23° C. or at least 30 kg/mm$^2$ at 250° C.;

(d) tensile elongation being at least 5% at 23° C.; and (e) heat shrinkage (220° C./30 min) being at most 20%.

(Measurements of physical properties)

Density of PTK portions (25° C.):

Where the thermoplastic material as the raw material of the fibers is composed of the PTK alone, the density (25° C.) of PTK portions is the same as the density (25° C.) of the fibers. Where the thermoplastic material contains the thermoplastic resin and/or filler as a further component in addition to the PTK, a sample is separately prepared under the same conditions for the production of the fibers by using the same thermoplastic material except for the omission of the PTK, and the density (25° C.) of PTK portions can be determined from the density (25° C.) of the fibers and the density (25° C.) of the sample free of the PTK.

$$\text{Density of the fibers} = 1 \bigg/ \left\{ \frac{\text{Weight fraction of } PTK \text{ portions}}{\text{Density of } PTK \text{ portions}} + \frac{1 - (\text{Weight fraction of } PTK \text{ portions})}{\text{Density of sample free of } PTK} \right\}$$

Tensile strength:

JIS-L1013 was followed (sample length: 300 mm; drawing rate: 300 mm/min).

Tensile modulus:

JIS-L1013 was followed [stress (modulus of elasticity) at 1% deformation (elongation)].

Tensile elongation:

JIS-L1013 was followed. Heat shrinkage (220° C./30 min):

After aging each fiber sample at 220° C. for 30 minutes, the degree of shrinkage of the sample was determined.

As has been described above, the PTK fibers of this invention are fibers obtained by using a melt-stable PTK having a high molecular weight of 0.3-2 dl/g in terms of reduced viscosity, a density of 1.34 g/cm$^3$ when annealed at 280° C. for 30 minutes and a melting point, Tm of 310–380° C. The PTK fibers thus have high heat resistance and strength.

Application Fields of PTK Fibers of This Invention

Although the fibers of this invention are not used in any particularly limited fields, industrial filters, heat-insulating materials, reinforcing fibers, insulating tapes, insulating cloths, fireproof wears, high-temperature gloves, prepreg fibers, tension members for optical-fiber cables, etc. may be mentioned by way of example as their specific application fields.

ADVANTAGES OF THE INVENTION

PTK fibers having high heat resistance and strength were successfully obtained by the present invention. PTKs according to conventional techniques had poor melt stability, so that melt spinning was not applicable thereto. Owing to the use of the novel melt-stable PTK in this invention, melt spinning has become feasible and moreover, PTK fibers having excellent physical properties have been provided.

The PTK fibers according to this invention can be used in a wide variety of fields in which heat resistance and strength are required.

EMBODIMENTS OF THE INVENTION

The present invention will hereinafter be described more specifically by the following Examples, Comparative Examples and Experiments. It should however be borne in mind that the scope of the present invention is not limited to the following Examples and Experiments.

Experiments

Synthesis Experiment 1 (Synthesis of Melt-Stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.6 wt.%; product of Sankyo Kasei Co., Ltd.) and 90 kg of N-methylpyrrolidone (hereinafter abbreviated as "NMP") (water content/NMP =5.0 moles/kg). After the reactor being purged with nitrogen gas, the resultant mixture was heated from room temperature to 240° C. over 1.5 hours and then maintained at 240° C. for 2.5 hours. In order to apply the stabilization treatment in the final stage of the polymerization, the reaction mixture was heated up to 260° C. over 1 hour while charging under pressure a mixture composed of 9.0 moles of DCBP, 15 kg of NMP and 75 moles of water. The resultant mixture was maintained further at 260° C. for 0.3 hour to react them.

The reactor was cooled, and the reaction mixture in the form of a slurry was taken out of the reactor and was then poured into about 200 l of acetone. The resultant polymer was precipitated, recovered by filtration, and then washed twice with acetone and additionally twice with water. Acetone and water were removed to obtain the polymer in a wet form. The wet polymer was dried at 80° C. for 12 hours under reduced pressure, thereby obtaining Polymer P1.

When the physical properties of Polymer P1 were measured, Tm was found to be 366° C., $\Delta$Hmc (420° C./10 min) 56 J/g, Tmc (420° C./10 min) 306° C., and the reduced viscosity 0.81 dl/g. In addition, the density (25° C.) of Polymer P1 was 1.30 g/cm$^3$ in an amorphous form and 1.35 g/cm$^3$ in an annealed form.

<Measurement Methods of Physical Properties>

Measurement of melting point:

With respect to the PTK thus obtained, the melting point, Tm was measured as an index of its heat resistance. The measurement was performed in the following manner. About 10 mg of each PTK (powder) was weighed. The sample was held at 50° C. for 5 minutes in an inert gas atmosphere and then heated up at a rate of 10° C./min so as to measure its melting point on a DSC (Model TC10A; manufactured by Mettler Company).

Measurement of residual melt crystallization enthalpy:

With respect to the PTK obtained above, the residual melt crystallization enthalpy, $\Delta$Hmc (420° C./10 min) was measured as an index of its melt stability. Namely, the temperature corresponding to a peak of melt crystallization measured by the DSC is represented by Tmc (420° C./10 min) and the amount of heat converted from the area of the peak was taken as residual melt crystallization enthalpy, $\Delta$Hmc (420° C./10 min). Described specifically, about 10 mg of the PTK (powder form) was weighed. After holding the PTK at 50° C. for 5 minutes in an inert gas atmosphere, it was heated up at a rate of 75° C./min to 420° C. and held at that temperature for 10 minutes. While cooling down the PTK at a rate of 10° C./min, its $\Delta$Hmc (420° C./10 min) and Tmc (420° C./10 min) were measured.

Measurements of density and solution viscosity

The density of the PTK was measured as an index of its crystallinity of the PTK. Namely, the PTK (powder) was first of all placed between two polyimide films ("Kapton", trade mark; product of E.I. du Pont de Nemours & Co., Inc.). Using a hot press, it was preheated at 385° C. for 2 minutes and then press-formed at 385° C. for 0.5 minute. It was then quenched to obtain an amorphous sheet whose thickness was about 0.15 mm. A part of the amorphous sheet was used directly as a sample, while the remaining part was annealed at 280° C. for 30 minutes to use it as an annealed sample with an increased degree of crystallinity. Their densities were measured separately at 25° C. by means of a density gradient tube (lithium bromide/water).

The solution viscosity (reduced viscosity, $\eta_{red}$) of the PTK was also measured as an index of its molecular weight.

Namely, the PTK was dissolved in 98wt.% sulfuric acid to give a polymer concentration of 0.5 g/dl. The viscosity of the resultant solution was then measured at 25° C. by means of a Ubbellohde viscometer.

Example 1 (Melt Spinning)

Under a nitrogen gas stream, the PTK polymer, P1 was charged into an extruder having a cylinder diameter of 35 mm and equipped with a spinneret which had 40 fine holes, each of 0.5 mm across. The PTK polymer was extruded at an extrusion temperature of 375° C. and a draw down ratio (the ratio of the take-up speed of spun fibers to the discharge rate of the resin from the spinneret) of about 200, and then was cooled through a nitrogen gas environment, so that unstretched fibers were obtained.

The unstretched fibers were stretched 3.2 times on a hot plate of 160° C. and then caused to pass for 2.5 seconds through hot air of 280° C. so as to heat set them.

The thus-obtained fibers had the following physical properties. Fiber diameter: 20 μm. Tensile strength (23° C.): 38 Kg/mm$^2$ Tensile modulus (23° C.): 400 kg/mm$^2$ Tensile elongation (23° C.): 25%. Heat shrinkage (220° C./30 min): 7.5%. Density (25° C.): 1.36 g/cm³.

The tensile strength of the fibers was measured after they were left over for 500 hours in an atmosphere of 220° C. It was 35.5 kg/mm².

At 250° C., their tensile strength was 20.5 kg/mm² while their tensile modulus was 150 kg/mm².

Example 2:

Polymer P2 was obtained by conducting polymerization in the same manner as in Synthesis Experiment 1 except that 90.9 moles of DCBP was charged instead of 90 moles of DCBP and the reaction time at 240° C. was changed to 1.5 hours.

Example 3:

Polymer P3 was obtained by conducting polymerization in the same manner as in Synthesis Experiment 1 except that a mixture of 89.1 moles of DCBP and 0.9 mole of 2,2′,4,4′-tetrachlorobenzophenone was charged instead of 90 moles of DCBP.

Comparative Example 1:

Polymer CP1 was obtained by conducting polymerization in the same manner as in Synthesis Experiment 1 except that 91.8 moles of DCBP were charged instead of 90 moles of DCBP and that the reaction time at 240° C. was changed to 2 hours.

Comparative Example 2

Polymer CP2 was obtained by conducting polymerization in the same manner as in Synthesis Experiment 1 except that a mixture of 85 moles of DCBP and 5.0 moles of 2,2′,4,4′-tetrachlorobenzophenone was charged instead of 90 moles of DCBP.

The individual PTKs were separately melt-spun in the same manner as in Example 1, thereby producing unstretched fibers respectively.

Physical properties of the PTKs and their processability upon melt spinning are shown in Table 1.

Those unstretched fibers were separately stretched 3.2 times on a hot plate of 160° C. and then heat set at 1.02 times in hot air of 280° C.

Physical properties of stretched yarns of Examples 2–3 are summarized in Table 2.

TABLE 1

| | Physical properties of PTK | | | | | Processability | |
|---|---|---|---|---|---|---|---|
| | $\eta_{red}$ (dl/g) | Tm (°C.) | ΔHmc** (J/g) | Tmc*** (°C.) | Density**** (g/cm³) | Melt Spinnable properties | Remarks Polymer No. |
| Comp. Ex. 1 | 0.25 | 366 | 45 | 285 | 1.35 | Drawdown took place. Severe fiber unevenness and early sticking of grime on spinneret, frequent fiber breakages. Failed to give unstretched fibers. | CP1 |
| Ex. 2 | 0.40 | 365 | 50 | 303 | 1.35 | Some tendency of drawdown was observed, but spinning was feasible. | P2 |
| Ex. 3 | 0.97 | 353 | 51 | 300 | 1.35 | Good | P3 |
| Comp. Ex. 2 | —* | 340 | 43 | 280 | 1.34 | Poor | CP2 |

*Some portions were insoluble in 98 wt. % sulfuric acid.
**(420° C./10 min).
***(420° C./10 min).
****(Annealed fibers).

TABLE 2

| | Physical properties of stretched fibers | | | | | | | |
|---|---|---|---|---|---|---|---|---|
| P.P. of PTK* $\eta_{red}$ (dl/g) | Fiber diameter (μm) | Tensile strength (kg/mm²) 23° C. | Tensile strength (kg/mm²) 250° C. | Tensile elongation (%) 23° C. | Tensile modulus (kg/mm²) 23° C. | Tensile modulus (kg/mm²) 250° C. | Density (g/cm³) 25° C. | Remarks Polymer No. |
| Ex. 2  0.40 | 20 | 25 | 13 | 20 | 280 | 120 | 1.36 | P2 |
| Ex. 3  0.97 | 20 | 39 | 20 | 22 | 370 | 150 | 1.36 | P3 |

*P.P.: Physical property.

Example 4:

Using the facilities similar to those employed in Example 1, unstretched fibers which had been extruded at 370° C. and spun at a draw down ratio of about 100 were stretched 5.0 times in an atmosphere of 156° C., heat set in hot air of 315° C.

The thus-obtained fibers had the following physical properties. Fiber diameter: 23 μm. Tensile strength (23° C.): 41 Kg/mm² Tensile modulus (23° C.): 430 kg/mm². Heat shrinkage (220° C./30 min): 6.2%. Density (25° C.): 1.36 g/cm³.

The tensile strength of the fibers was measured after they were left over for 500 hours in an atmosphere of 220° C. It was 37 kg/mm².

At 250° C., their tensile strength was 25 kg/mm² while their tensile modulus was 160 kg/mm².

Example 5:

Under a nitrogen gas stream, the PTK polymer, P1 was charged into an extruder having a cylinder diameter of 40 mm and equipped with a spinneret which had 6 fine holes, each of diameter 1.0 mm. The PTK polymer was extruded at an extrusion temperature of 370° C. and a draw down ratio of 10 and then cooled in warm water of 50° C., so that unstretched fibers were obtained.

The unstretched fibers were stretched 3.3 times in hot glycerin of 155° C., and heat set with 4% relaxation in the hot air of 300° C.

The thus-obtained fibers had the following physical properties. Fiber diameter: 170 μm. Tensile strength (23° C.): 41 Kg/mm². Tensile modulus (23° C.): 380 kg/mm². Heat shrinkage (220° C./30 min): 6.5%. Density (25° C.): 1.36 g/cm³.

The tensile strength of the fibers was measured after they were left over for 300 hours in an atmosphere of 220° C. It was 38.5 kg/mm².

At 250° C., their tensile strength was 17 kg/mm² while their tensile modulus was 130 kg/mm².

obtained above in Synthesis Experiment 2, thereby obtaining a raw material for spinning.

To 100 parts by weight of Polymer P1 (PTK), the PPS obtained in Synthesis Experiment 2 were added at the proportions given in Table 3. The resultant mixtures were separately extruded at 370–380° C. into pellets.

Using those pellet samples separately as raw materials, melt spinning was performed by the same facilities as those used in Example 1, thereby obtaining unstretched fibers.

The thus-obtained fiber samples were separately stretched 3.0 times on a hot plate and then heat set at 275° C. while maintaining their length constant. Temperature conditions for the hot plate are also given in Table 3. All the the resultant fiber samples had a fiber diameter of 2 μm.

Physical properties of the thus-obtained fiber samples are also shown in Table 3.

TABLE 3

| | Mixing ratio of polymers, PTK/PPS (by weight) | Temperature of hot plate (°C.) | Tensile strength (kg/mm²) | | Heat shrinkage (%) (220° C./30 min) |
|---|---|---|---|---|---|
| | | | 23° C. | 250° C. | |
| Ex. 1 | 100/0 | 160 | 38 | 20 | 7.5 |
| Ex. 6 | 100/10 | 150 | 40 | 21 | 10 |
| Ex. 7 | 100/20 | 146 | 37 | 19 | 11 |
| Ex. 8 | 100/30 | 142 | 35 | 17 | 12 |
| Ex. 9 | 100/40 | 138 | 34 | 17 | 14 |
| Ex. 10 | 100/50 | 135 | 31 | 15 | 15 |
| Comp. Ex. 3 | 100/60 | 132 | 30 | 14 | 21 |
| Comp. Ex. 4 | 100/70 | 131 | 28 | 13 | 24 |
| Comp. Ex. 5 | 100/80 | 124 | 34 | 13 | 30 |
| Comp. Ex. 6 | 100/90 | 119 | 36 | 12 | 35 |

Synthesis Experiment 2: (Synthesis of poly paraphenylene sulfide)

A 20 l autoclave was charged with 11.0 kg of NMP and 4.24 kg of hydrated sodium sulfide (water content: 53.98 wt.%; product of Nagao Soda K.K.) (25.0 moles as sodium sulfide). The resultant mixture was heated up gradually to 203° C. under stirring over about 2 hours in a nitrogen gas atmosphere, so that 1.59 kg of water, 1.96 kg of NMP and 0.58 mole of hydrogen sulfide were distilled out.

After cooling down the reaction mixture to 130° C., 3.59 kg (24.42 moles) of p-dichlorobenzene (p-DCB) and 3.17 kg of NMP were added. The resultant mixture was heated at 215° C. for 8 hours for polymerization. Thereafter, 1.275 kg of water was added and in a nitrogen atmosphere, the resultant mixture was heated up to 265° C. At that temperature, polymerization was conducted for 4 hours. After cooling the reaction mixture, the resultant polymer was collected from the reaction mixture by filtration, washed repeatedly with deionized water, and then dried at 100° C. under reduced pressure.

The thus-obtained polymer was a crystalline polymer having a melt viscosity was 3,000 poises (310° C., shear rate: 1,200/sec) and a melting point, Tm of 282° C. The polymer (hereinafter abbreviated as "PPS") was melt-extruded at 330° C., thereby obtaining pellets.

Examples 6–10 & Comparative Examples 3–6:

Polymer P1 obtained above in Synthesis Experiment 1 was used as a PTK. The PTK was added with PPS As is apparent from Table 3, the tensile strength, especially, the tensile strength at the high temperature of 250° C. decreased and the heat shrinkage factor increased when the proportion of the PPS exceeded 50 parts by weight. Accordingly, it was only possible to obtain fibers inferior in both heat resistance and strength.

In contrast, it is appreciated that the Examples of the present invention, in each of which the proportion of the PPS was not greater than 50 parts by weight, gave fibers excellent in tensile strength and heat shrinkage and featuring well-balanced heat resistance and strength.

We claim:

1. A process for the production of poly(arylene thioether-ketone) fibers, which comprises melt-extruding a thermoplastic material, which comprises:

(A) 100 parts by weight of a melt-stable poly(arylene thioether-ketone) having predominant recurring units of the formula

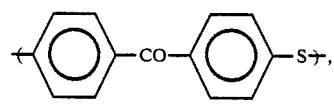

wherein the —CO— and —S— are in the para position to each other, and having the following physical properties (a)-(c):

(a) melting point, Tm being 310–380° C.;

(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and (c) reduced viscosity being 0.3–2 dl/g as determined by viscosity measurement at 25° C. and a polymer concentration of 0.5 g/dl in 98 percent by weight sulfuric acid; and optionally, (B) up to 50 parts by weight of at least one of thermoplastic resins at an extrusion temperature of 320–430° C. through a spinneret, stretching the resultant fibers to a draw ratio of from 1.2:1 to 8:1 within a temperature range of 120–200° C., and then heat setting the thus-stretched fibers at 130–370° C. for 0.1–1,000 seconds.

2. The process as claimed in claim 1, wherein the poly(arylene thioether-ketone) has a density of at least 1.34 g/cm³ at 25° C. when annealed at 280° C. for 30 minutes.

3. The process as claimed in claim 1, wherein the poly(arylene thioether-ketone) is an uncured polymer.

4. The process as claimed in claim 1, wherein the poly(arylene thioether-ketone) is a polymer having a partially crosslinked and/or branched structure.

5. The process as claimed in claim 1, wherein the thermoplastic resin is a poly(arylene thioether) having predominant recurring units of the formula

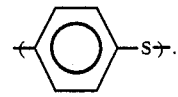

6. The process as claimed in claim 1, wherein the fibers have the following physical properties:
   (a) density of portions of said poly(arylene thioether-detone) being at least 1.34 g/cm³ at 25° C.;
   (b) tensile strength being at least 10 kg/mm² at 23° C. or at least 3 kg/mm² at 250° C.;
   (c) tensile modulus being at least 100 kg/mm² at 23° C. or at least 30 kg/mm² at 250° C.;
   (d) tensile elongation being at least 5% at 23° C.; and
   (e) heat shrinkage (220° C./30 min) being at most 20%.

* * * * *